US012552640B2

(12) United States Patent
Jensen et al.

(10) Patent No.: US 12,552,640 B2
(45) Date of Patent: Feb. 17, 2026

(54) DRIVE UNIT PLACEMENT AND ACCESS OPENINGS FOR A PLATFORM LIFTING SYSTEM

(71) Applicant: LIFTUP A/S, Støvring (DK)

(72) Inventors: Julie Giltoft Jensen, Støvring (DK); Jonas Bruun Drejer, Støvring (DK)

(73) Assignee: LIFTUP A/S, Støvring (DK)

( * ) Notice: Subject to any disclaimer, the term of this patent is extended or adjusted under 35 U.S.C. 154(b) by 0 days.

(21) Appl. No.: 18/856,769

(22) PCT Filed: Apr. 19, 2023

(86) PCT No.: PCT/EP2023/060088
§ 371 (c)(1),
(2) Date: Oct. 14, 2024

(87) PCT Pub. No.: WO2023/203055
PCT Pub. Date: Oct. 26, 2023

(65) Prior Publication Data

US 2025/0256942 A1 Aug. 14, 2025

(30) Foreign Application Priority Data

Apr. 20, 2022 (EP) .................................... 22169058

(51) Int. Cl.
*B66B 9/08* (2006.01)

(52) U.S. Cl.
CPC .................................. *B66B 9/0853* (2013.01)

(58) Field of Classification Search
CPC ......... B66B 9/0853; B66B 9/00; B66B 9/187; B66B 11/0045
See application file for complete search history.

(56) References Cited

U.S. PATENT DOCUMENTS 3,661,228 A * 5/1972 Glasser ..................... B66B 9/00 187/217
4,712,788 A 12/1987 Gaudreau, Jr.
4,953,665 A * 9/1990 Paquin ...................... B66B 9/00 414/921
5,026,244 A * 6/1991 Dorn ...................... A61G 3/062 414/921
5,499,694 A * 3/1996 Dorn ......................... B64F 1/31 414/921

(Continued)

FOREIGN PATENT DOCUMENTS

EP 1914187 A1 * 4/2008 ........... B66B 9/0853
FR 2996833 A1 * 4/2014 ........... B66B 9/0853

(Continued)

OTHER PUBLICATIONS

Machine translation of the description of FR 2996833 A1, Debacque et al. (Year: 2014).*

(Continued)

*Primary Examiner* — Minh Truong
*Assistant Examiner* — Michelle M Mudwilder
(74) *Attorney, Agent, or Firm* — J. Peter Paredes; Amin Wasserman Gurnani LLP

(57) ABSTRACT

The invention relates to a platform lifting system (100) for transporting a person or an object from at least a first level to a second level, wherein the platform lifting system comprises: a drive unit (200), a platform (300), at least two vertical columns (400), a drive system (500), at least two access openings (600), wherein the drive unit (200) is mounted between the two columns (400), said drive unit can be placed anywhere within an area defined by the two columns, and wherein the drive unit (200) has a depth being equal or less than the depth of the two columns (400), enabling the platform (300) to pass the drive unit when moving up or down on the two columns. Furthermore, the invention relates to a method for moving a platform of a platform lifting system (100) from at least a first level to second level, and to a computer program.

18 Claims, 9 Drawing Sheets

(56) References Cited

U.S. PATENT DOCUMENTS

| | | | | |
|---|---|---|---|---|
| 5,553,990 | A * | 9/1996 | Kytola, Sr. | B66B 9/0853 414/592 |
| 5,833,031 | A | 11/1998 | Liebetrau et al. | |
| 5,901,812 | A | 5/1999 | Meunier | |
| 5,941,347 | A * | 8/1999 | Pfleger | B66F 7/04 187/244 |
| 7,025,177 | B1 * | 4/2006 | Yang | B66B 7/027 187/254 |
| 10,406,047 | B1 * | 9/2019 | Runnels | A61G 5/104 |
| 10,597,274 | B1 * | 3/2020 | Busuttil | B66F 11/04 |
| 2007/0137944 | A1 | 6/2007 | Lam | |
| 2015/0272799 | A1 | 10/2015 | Tiffin et al. | |
| 2021/0078822 | A1 * | 3/2021 | Nash | B66B 9/00 |
| 2021/0078824 | A1 | 3/2021 | Nash et al. | |

FOREIGN PATENT DOCUMENTS

| | | | | |
|---|---|---|---|---|
| RU | 173944 | U1 * | 9/2017 | |
| WO | WO-2007068126 | A1 * | 6/2007 | B66B 9/00 |

OTHER PUBLICATIONS

European Patent Office, Extended European Search Report for corresponding application EP22169058.9 dated Oct. 20, 2022, 7 pages.

WIPO/ISA/EPO, International Search Report and Written Opinion issued in corresponding International Application No. PCT/EP2023/060088 on May 31, 2023, 14 pages.

IndiaMart, "Stainless steel and Glass Wheelchair Platform Lifts, Capacity: 1 Person", Retrieved on Jan. 1, 2025 from the Internet: https://www.indiamart.com/proddetail/wheelchair-platform-lifts-19174081755.html, 5 pages.

United States Access Board, "Guide to the ADA Accessibility Standards", Retrievable from the Internet: https://www.access-board.gov/ada/guides/chapter-4-elevators-and-platform-lifts/, Jul. 2015, 19 pages.

KEP Lifts Ltd, "Open Platform Lifts", Retrieved on Jan. 1, 2025 from the Internet: https://www.keplifts.co.uk/open-platform-lifts, 5 pages.

* cited by examiner

DRIVE UNIT PLACEMENT AND ACCESS OPENINGS FOR A PLATFORM LIFTING SYSTEM

CROSS-REFERENCE TO RELATED APPLICATIONS

The present application claims priority to PCT application serial no. PCT/EP2023/060088, filed Apr. 19, 2023, which claims priority to European patent application serial no. 22169058.9, filed Apr. 20, 2022, each herein incorporated by reference in their entireties.

FIELD OF THE INVENTION

The present invention relates to a lifting system for transporting a person or an object from at least a first level to a second level, wherein the lifting system comprises a drive unit mounted between the two columns, and wherein said drive unit can be placed anywhere within an area defined by the two columns.

BACKGROUND OF THE INVENTION

Within the field of lifting systems, especially platform lifting systems, it is known that the mounting and installation of the lifting system might be quite problematic due to the fact that a platform lifting system must fulfil certain requirements and must provide a certain amount of opportunities, while the lifting system also has to be reliably and effectively mounted and installed on a building, outside or inside.

Most platform lifting systems known today have a standard configuration and arrangement of the lifting system and the possibility of changing or altering the configuration is extremely limited. As a consequence, the potential positions of the platform lifting system are limited to very specific locations in or on a building, since known platform lifting system are often mounted on or in already existing buildings.

The missing opportunity of adapting a platform lifting system relative to the building it is to be mounted and installed on or in is making the choice of mounting positions of lifting systems exceptionally limited.

Hence, an improved lifting system and method for moving a platform of a platform lifting system from a first level to second level would be advantageous, and in particular, a more efficient, reliable and/or modifiable and adaptable platform lifting system and method would be advantageous.

OBJECT OF THE INVENTION

In particular, it may be seen as an object of the present invention to provide a lifting system that solves the above mentioned problems of the prior art.

It is a further object of the present invention to provide an alternative to the prior art.

SUMMARY OF THE INVENTION

Thus, the above described object and several other objects are intended to be obtained in a first aspect of the invention by providing a platform lifting system for transporting a person or an object from at least a first level to a second level, wherein the platform lifting system comprises:

- a drive unit,
- a platform,

- at least two vertical columns, wherein said columns are adapted to facilitate an up and a down movement of the platform,
- a drive system positioned on or within at least one of the two columns, wherein said drive system is adapted to facilitate the up and down movement of the platform,
- at least two access openings, a first and a second,
- wherein the drive system is a closed end system, preferably a closed end belt system,
- wherein the drive unit is mounted between the two columns, said drive unit can be placed anywhere within an area defined by the two columns, and
- wherein the drive unit has a depth being equal or less than the depth of the two columns, enabling the platform to pass the drive unit when moving up or down on the two columns.

The invention is particularly, but not exclusively, advantageous for obtaining a lifting system with the possibility of changing and/or altering the configuration of the lifting system, especially the drive unit placement, such that the potential positions of the platform lifting system are not limited to specific locations inside or outside a building. Thereby, the platform lifting systems of the invention can easily and reliable be mounted outside or inside already existing buildings without the need of modifying the building.

Moreover, the platform lifting system providing the opportunity of placing the drive unit anywhere between the area defined by the two columns of the main structure, allows the lifting system to be mounted without the necessity of making room for the drive system in the floor or in the ceiling of an associated building e.g. by making a hole in the floor or ceiling.

Therefore, the lifting system can be mounted at any desirable site inside or outside a building without the need of breaking or demolishing anything, such as making a hole for obtaining room for the drive unit.

Furthermore, the embodiment is particularly, but not exclusively, advantageous for obtaining a platform lifting system providing an easily accessible drive unit, so that the service and maintenance of the lifting system is made a lot more convenient and effective.

Also, the embodiment is particularly, but not exclusively, advantageous for providing a free positioning of the access openings to the lifting system, such as through the columns, and preferably through a wall.

Within the context of the invention it should be understood, that when referring to at least "a first level" and "a second level", it is to be understood as two floors, which can be any floor in the building, and is not necessarily to be understood as the first floor and the second floor.

Some examples for the understanding:

The Platform Moving Up:

- "First level"=first floor & "second level"=second floor,
- "First level"=first floor & "second level"=fourth floor, or
- "First level"=basement & "second level"=first floor,
- Etc.

The Platform Moving Down:

- "First level"=third floor & "second level"=second floor, or
- "First level"=fifth floor & "second level"=first floor, or
- "First level"=fourth floor & "second level"=basement,
- Etc.

It should be understood that the platform can move from more than only two levels. Such that the platform can also move to a third, fourth, fifth, sixth, etc. level within the context of the invention. The platform is moving between at least two levels, however no upper limit of levels should define the scope of the invention.

Within the context of the invention, the drive unit preferably comprises a least:

a motor, preferably an electric motor a gear system, and a driving pulley.

The "Drive unit" may also within the invention be recognised and understood as a "motor box", "gear box" or the like.

Within the context of the invention, "access openings" may be understood as openings for access at the different floors/levels. The access opening can be just an opening, however it is preferred that the openings comprise a door or a gate, or the like.

It should be understood that when describing an access opening as "a first" access opening, "a second" access opening, "a third access" opening and so on, the numbering of the openings is only to make the illustration and understanding easier. The numbering of the access openings should not be limiting to the invention. Such that an access opening being numbered as "the/a second" access opening in one lifting system, may be numbered as "the/a third" access opening in another lifting system. The numbering will depend of the configuration of the lifting system and the associated building that the lifting system is to be mounted at.

Within the context of the invention "closed end system" may be understood as a drive system comprising an endless configuration, such as a closed end belt system with an endless belt, closed end chain system with a chain, or closed end rope/wire system.

It should be understood that a belt or the like can be connected at its ends via a connecting element, preferably a a laser-cut steel tube or another kind of tube or the like. Preferably, the platform is connected to the endless belt at the connecting element. The belt is via the connecting element "endless" in the sense that the ends are fixed in the same tube and can therefore not move in relation to each other.

In an embodiment of the invention, the at least two columns are mounted on a wall of an associated building.

The embodiment is particularly, but not exclusively, advantageous for obtaining a lifting system that can be mounted on any suitable wall of a building, and thereby more or less any desirable place in or on a building. The wall can be either an inside wall or an outside wall.

The type of wall should not be limited for the invention, however the wall construction should be suitable for bearing some weight of the lifting system.

In an embodiment of the invention, the first access opening is through the wall of the associated building.

The embodiment is particularly, but not exclusively, advantageous for obtaining a lifting system providing the opportunity of allowing an access from the platform of the lifting system through a wall of the associated building. Thereby providing the opportunity of freely positioning the desirable openings of the lifting system. The first access opening through the wall is preferably made between the two columns of the lifting system.

Furthermore, the embodiment is particularly, but not exclusively, advantageous for obtaining a lifting system, wherein an access opening is not only possible through the doors of the platform lift, but also can be provided through the two columns and potentially through a wall of the building.

In an embodiment of the invention, the at least two columns are mounted on at least one associated floor deck of an associated building.

The embodiment is particularly, but not exclusively, advantageous for obtaining a lifting system that can be mounted on any suitable floor deck of a building and thereby more or less any desirable place in or on a building. The flor deck can be either an inside floor deck or and outside floor deck.

The type of floor deck should not be limited for the invention, however the floor deck construction should be suitable for bearing some weight of the lifting system.

Within the context of the invention "floor deck" may be understood as an open floor deck, a covered floor deck, a mezzanine or the like.

In an embodiment of the invention, the first access opening is positioned under the at least one floor deck of the associated building.

The embodiment is particularly, but not exclusively, advantageous for obtaining a lifting system, wherein an access opening is not only possible through the doors/gates of the platform lift, but can also be provided through the two columns. Thereby providing more potential access opening and a more free positioning opportunity of the access openings of the lifting system.

In an embodiment of the invention, the first access opening comprises at least one door, such as a hinged door or a sliding door.

The embodiment is particularly, but not exclusively, advantageous for obtaining a safe and secure lifting system with an access opening having an open/closed function, such that a user does not start entering the platform through the access opening/the door before the platform lift is in its right position.

Also, the doors provide an elegant appearance of the lifting system.

In an embodiment of the invention, the drive unit is mounted on an associated wall or an associated floor deck of an associated building.

The embodiment is particularly, but not exclusively, advantageous for providing the opportunity of placing the drive unit anywhere between the area defined by the two columns of the main structure, allowing the lifting system to be mounted without the necessity of making room for the drive system in the floor or in the ceiling of an associated building e.g. by making a hole in the floor or ceiling. Therefore, the lifting system can be mounted at any desirable site inside or outside a building without the need of breaking or demolishing anything, such as making a hole for obtaining room for the drive unit.

In an embodiment of the invention, the drive unit is positioned above the first access opening and below a second access opening.

The embodiment is particularly, but not exclusively, advantageous for obtaining a lifting system, wherein the commonly unexploited area between two openings is exploited for the placement of the drive unit. This position of the drive unit thereby exploits most possible area that is normally unexploited, meaning the need of using additional space is not necessary, when mounting the lifting system.

In an embodiment of the invention, the first access opening is positioned between the two columns and positioned at least substantially at the bottom of the two columns, such that an access opening in the lowermost floor level is provided, preferably though an associated wall.

The embodiment is particularly, but not exclusively, advantageous for obtaining a lifting system, wherein the area between the two columns at a lower level is exploited for an access opening, thereby potentially allowing an access from another room than the room the lifting system is mounted in. Furthermore, the exploitation of a usually unexploited area is in general within the invention, as explained, exploited for functional purposes, such as an extra access opening or the placement of a drive unit.

In an embodiment of the invention, the platform lifting system has at least three access openings, wherein;

- the first access opening being positioned between the two columns, preferably positioned at least substantially at the bottom of the two columns and below the drive unit,
- a second access opening being positioned between the two columns and above the first access opening, preferably positioned above the drive unit,
- a third access opening being positioned at the platform and being at least one of:
  - a platform front access opening, and/or
  - a first platform side access opening, and/or
  - a second platform side access opening.

The embodiment is particularly, but not exclusively, advantageous for obtaining a lifting system, wherein the potential possibilities of access openings/points are optimised most possible. The more possibilities of access openings, the more convenience of fitting the lifting system into a location inside or outside the building. Further, the more access openings provided for the lifting system, the more convenience for the consumer of the lifting system.

In an embodiment of the invention, the platform lift comprises an open platform, said open platform has an open top, or the platform lift comprises a closed platform, said closed platform has a top cover, such as a roof.

The embodiment is particularly, but not exclusively, advantageous for obtaining a lifting system, wherein the platform lift can be provided as an open platform lift, such as a platform provided with sides in a safety height, or as a closed platform lift, such as an cabin platform.

The platform lift can also be “partly” closed, such as an platform lift provided with sides in a safety height and a roof, without being an entirely closed cabin.

In an embodiment of the invention, the platform lift is mounted on an associated outdoor wall or associated outdoor floor deck of an associated building, or the platform lift is mounted on an associated indoor wall or associated indoor floor deck of an associated building.

The embodiment is particularly, but not exclusively, advantageous for obtaining a lifting system that can be located both on the outside of a building or the inside of a building. The construction and the elements of the lifting system is suitable for both an indoor or an outdoor location site.

The invention further relates to a second aspect of the invention being a method for moving a platform of a platform lifting system from a first level to second level, preferably a platform lifting system according to any of the preceding claims, wherein the method comprises at least the steps of:

- ensuring (S1) a platform being in a first level with an access opening,
- opening (S2) the first access opening, said access opening being positioned between two columns, said columns being adapted to facilitate an up and down movement of the platform via a drive system,
- allowing (S3) a person or an object to enter the platform via the access opening, wherein a first door or gate is opened to allow access,
- closing (S4) said door or gate,
- moving (S5) the platform in an upwards or downwards direction,
- passing (S6) a drive unit of the lifting system with the platform, said drive unit has a depth being equal or less than the depth of the two columns, enabling the platform to pass the drive unit when moving up or down on the two columns,
- stopping (S7) the movement of the platform, when the platform has reached a second level with another access opening,
- allowing (S8) a person or an object to exit the platform via the another access opening, wherein at least a second door or gate is opened to allow access to a the second level, and wherein the steps can be performed in any order, subsequently and/or simultaneously.

The aspect is particularly, but not exclusively, advantageous for obtaining a method wherein a lifting system obtains the possibility of changing and/or altering the configuration of said lifting system, especially the drive unit placement, since the placement of the drive unit can be provided between the columns and the lifting system, when moving, is allowed to pass the drive unit with the platform. Thereby, the potential positions of the platform lifting system are not limited to specific locations inside or outside a building. The platform lifting systems of the invention can easily and reliably be mounted outside or inside already existing buildings without the need of modifying the building.

Moreover, the platform lifting system providing the opportunity of placing the drive unit anywhere between the area defined by two columns of the the main structure, allows the lifting system to be mounted without the necessity of making room for the drive system in the floor or in the ceiling of an associated building e.g. by making a hole in the floor or ceiling. Therefore, the lifting system can be mounted at any desirable site inside or outside a building without the need of breaking or demolishing anything, such as making a hole for obtaining room for the drive unit and still allowing a smooth and reliable up and down movement of the platform.

The invention further relates to a third aspect of the invention being a computer program comprising instructions which, when the program is executed by a computer, cause the computer to carry out the method of the second aspect.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The lifting system according to the invention will now be described in more detail with regard to the accompanying figures. The figures show one way of implementing the present invention and are not to be construed as being limiting to other possible embodiments falling within the scope of the attached claim set.

FIG. 3*a* illustrates a lifting system in a lowermost level.

FIG. 3*b* illustrates a lifting system in a middle level.

FIG. 3*c* illustrates a lifting system in an uppermost level.

FIG. 5*a* illustrates a drive unit placement in a lowermost level near the floor.

FIG. 5*b* illustrates a drive unit placement in a middle part.

FIG. 5*c* illustrates a drive unit placement in a floor recess (a pit).

FIG. 5*d* illustrates a drive unit placement on a floor deck.

DETAILED DESCRIPTION OF AN EMBODIMENT

Figure 1B:
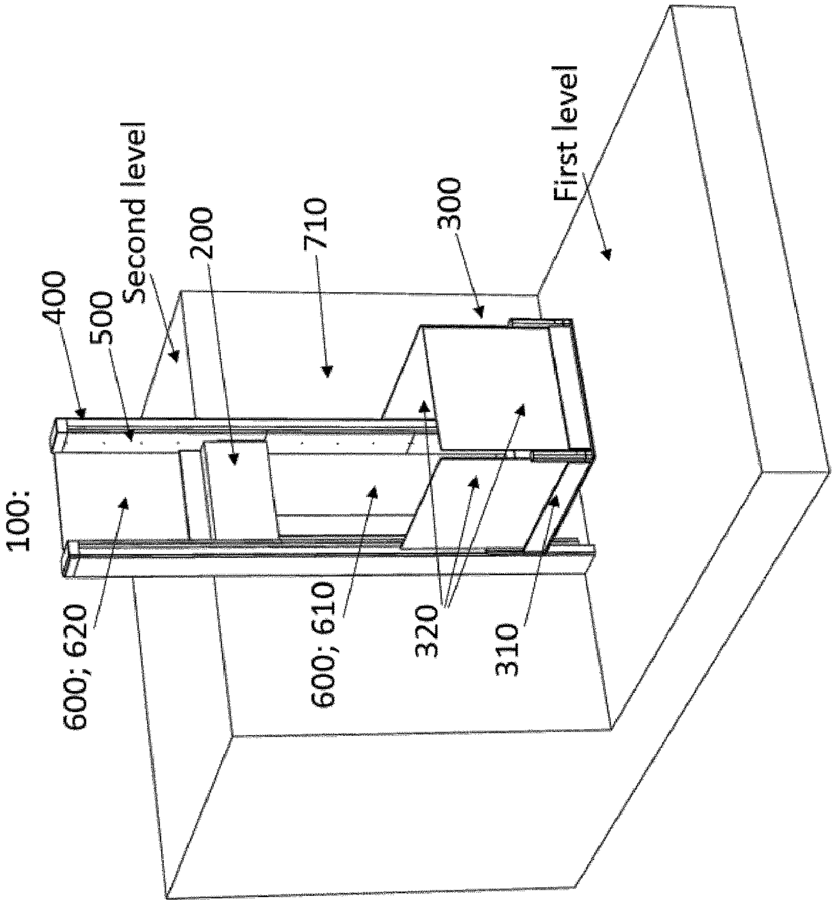
FIG. 1*b* illustrates a lifting system mounted on a wall and comprising an access opening through the columns and through a wall of an associated building.
Figure 1A:
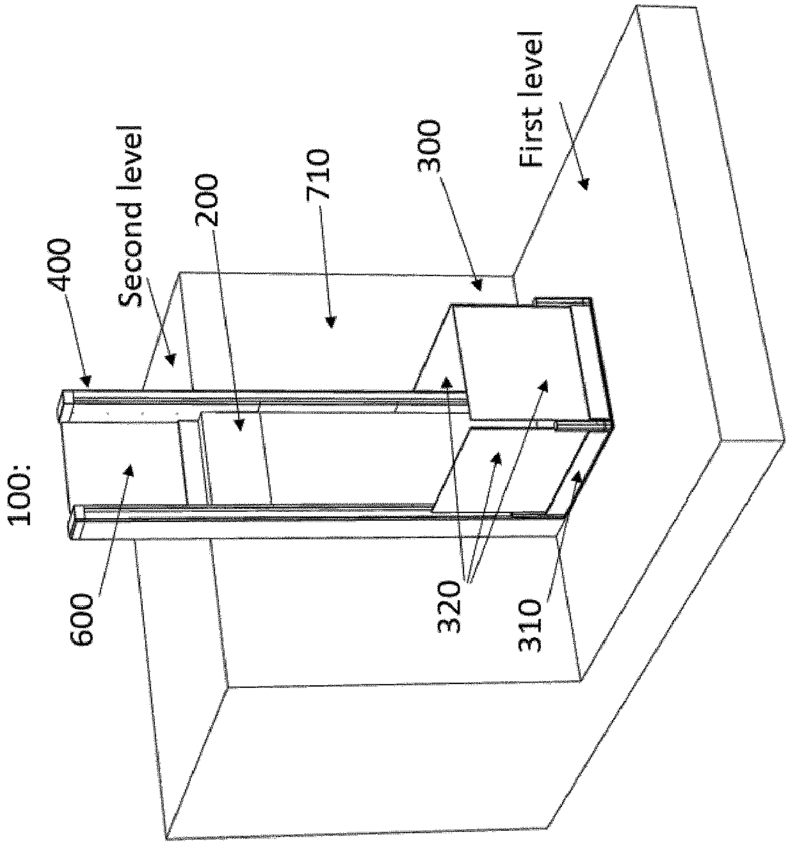
FIG. 1*a* illustrates a lifting system mounted on a wall and comprising a drive unit placed between two columns.

FIG. 1*a* illustrates a lifting system 100 mounted on a wall 710 and comprising a drive unit 200 placed between two columns 400. The lifting system illustrated is a platform lifting system for transporting a person or an object from at least a first level to a second level, wherein the platform lifting system comprises:

- A drive unit 200.
  - In FIG. 1, the drive unit is positioned in the middle part between two columns 400, however said drive unit 200 can be placed anywhere within an area defined by the two columns 400. The drive unit has a depth being equal or less than the depth of the two columns, enabling the platform 300 to pass the drive unit 200 when moving up or down on the two columns 400.
- A platform 300.
  - In FIG. 1, the platform 300 is illustrated as an open platform with a bottom 310 and sidewall 320 in a safety height. The sides 320 are preferably made of glass, however the material of the sides can vary depending on the desired construction. The platform lift 300 illustrated is an open platform, said open platform has an open top. However, within the invention, the platform could also be a closed platform, such as a cabin, or more "partly" closed such as providing the platform with a roof or other kind of top cover.
- At least two vertical columns 400, wherein said columns are adapted to facilitate an up and a down movement of the platform 300.
- A drive system 500 (not directly illustrated in FIG. 1) positioned on or within at least one of the two columns 400, wherein said drive system 500 is adapted to facilitate the up and down movement of the platform 300.
  - The drive system 500 of the lifting system is preferably a closed end belt system.
- At least two access openings 600.
  - A potential first access opening is not directly illustrated in FIG. 1, however the access opening may be provided by at least one of the sides 320 of the platform acting as an access opening 600. Alternatively, the access opening 600 is through the wall 710, as illustrated in FIG. 1*b*.

The lifting system 100 illustrated in FIG. 1*a* can be a lifting system mounted on an outdoor wall 710 or outdoor floor deck 720 (See FIG. 9) of an associated building, or mounted on an indoor wall or indoor floor deck of an associated building.

FIG. 1*b* illustrates a lifting system 100 mounted on a wall 710 and comprising an access opening 610 through the columns and through a wall of an associated building. The lifting system 100 illustrated is according to the description of the lifting system illustrated in FIG. 1*a*.

Furthermore, the lifting system 100 of FIG. 1*b* illustrates the possibility of having a first access opening 610 through the wall 710 of the associated building, preferably wherein the first access opening 610 is positioned between the two columns 400 and positioned at least substantially at the bottom of the two columns, such that an access opening 600 in the lowermost floor level is provided.

Figure 2A:
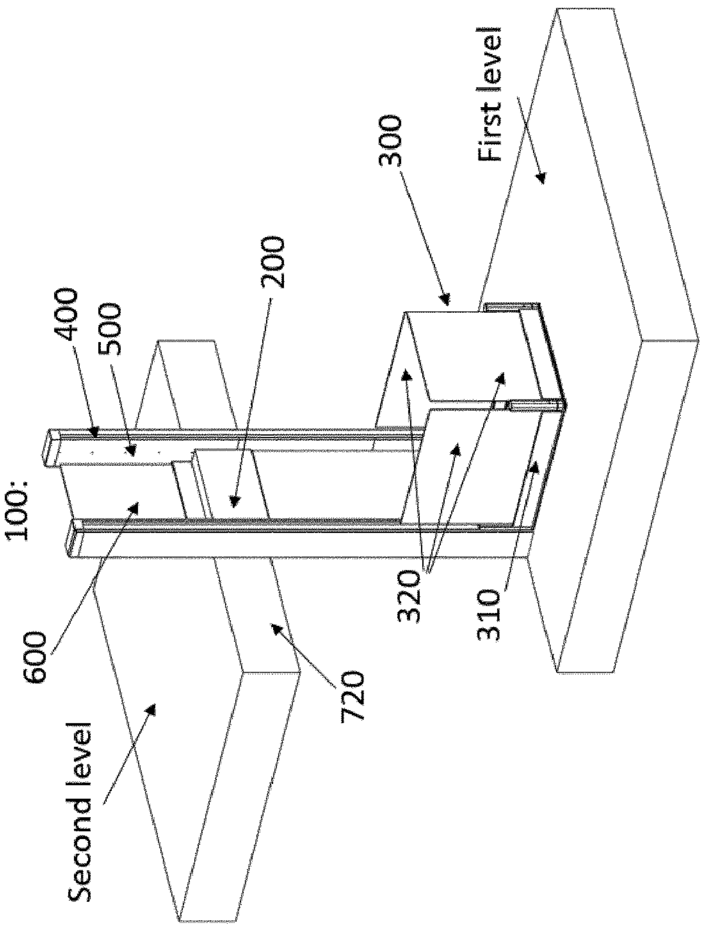
FIG. 2*a* illustrates a lifting system mounted on a floor deck and comprising a drive unit placed between two columns.
Figure 2B:
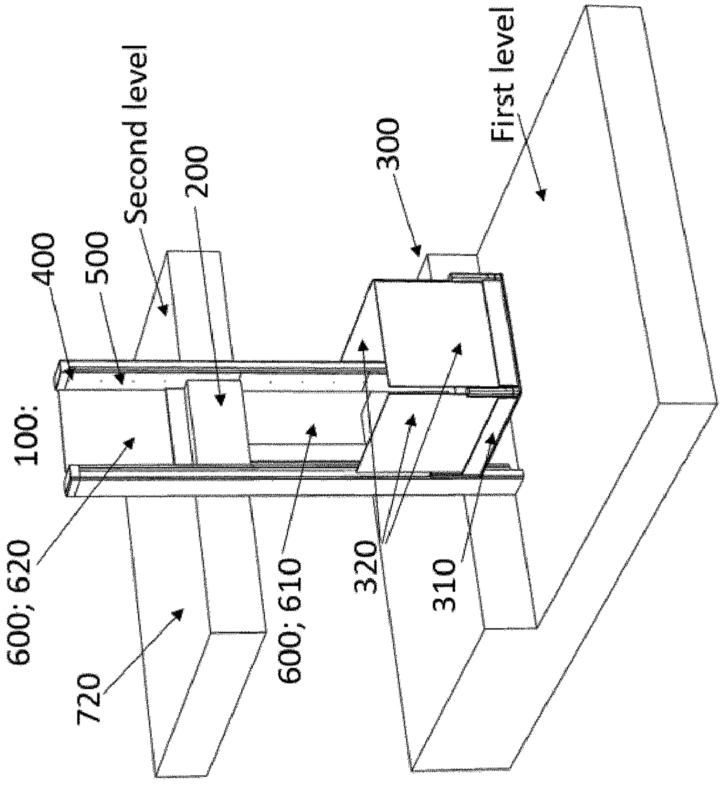
FIG. 2*b* illustrates a lifting system mounted on a floor deck and comprising an access opening through the columns.

FIG. 2*a* illustrates a lifting system 100 mounted on a floor deck 720 and comprising a drive unit 200 placed between two columns 400. In FIGS. 2*a* and 2*b*, both the drive unit 200 and the two columns 400 are mounted on at least one floor deck 720 of an associated building.

FIG. 2*a* illustrates a lifting system wherein potential access openings 600 are through one of the sides 320 of the platform at a lower level—the "first" level, and via a gate, preferably a glass gate, positioned between the two columns in an upper level—the second "level".

FIG. 2*b* illustrates a lifting system 100 mounted on a floor deck 720 and comprising an access opening 600 through the columns 400 and through a wall 710 of an associated building.

Thereby illustrating the potential of a first access opening 610 being through the columns 400 and being positioned under the at least one floor deck 720 of the associated building.

Also, FIG. 2*b* illustrates the potential of a lower level being "split" up in a first lower level and a second lower level. Such that the lower level comprises an elevation of the level. This elevation of the level may be defined as two different levels—a first level and a second level. The uppermost level in FIG. 2*b* would thereby be a third level.

It should be understood that the platform 300 can move between more than only two levels. Such that the platform can also move to a third, fourth, fifth, sixth, etc. level within the context of the invention. The platform is moving between at least two levels, however no upper limit of levels should define the scope of the invention.

Figure 3C:
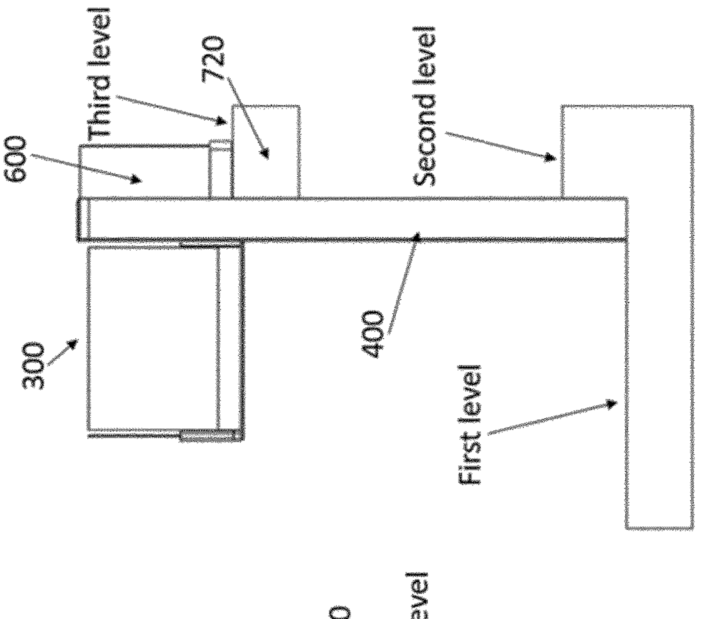
FIG. 3*a-c* illustrate a lifting system in a side-view.
Figure 3B:
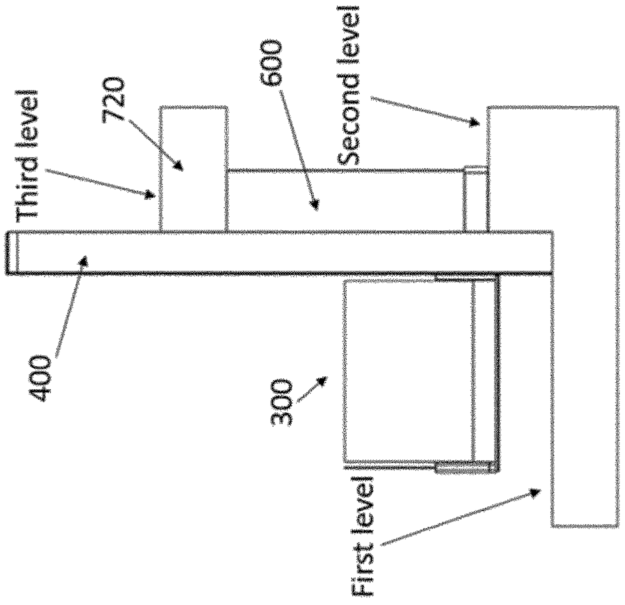
Figure 3A:
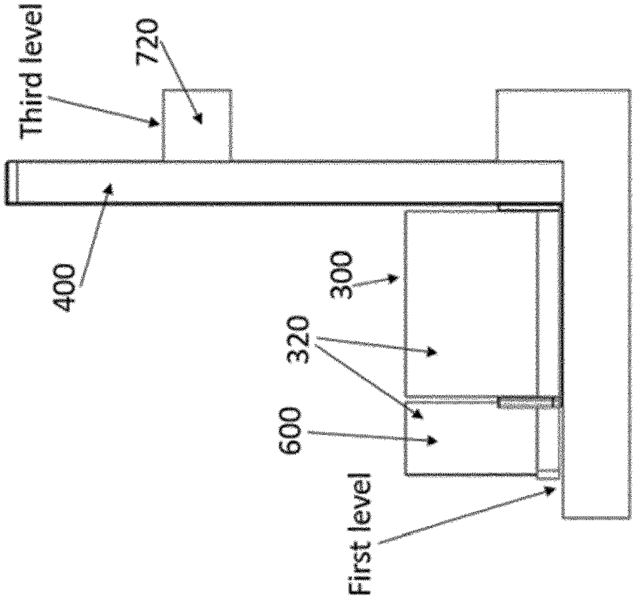

FIG. 3*a-c* illustrate a lifting system 100 in a side-view. FIG. 3*a* illustrates a lifting system in a lowermost level, being the first level. However, within the invention, the lowermost level could also be a basement level. Also, an access opening 600 being through one of the sides 320 of the platform 300 is illustrated as opened in FIG. 3*a*. FIG. 3*b* illustrates a lifting system 100 in a lower/middle level, being the second level. FIG. 3*c* illustrates a lifting system 100 in an uppermost level, being a third level. However, within the invention, the uppermost level could also be a higher level or higher floor.

Figure 4:
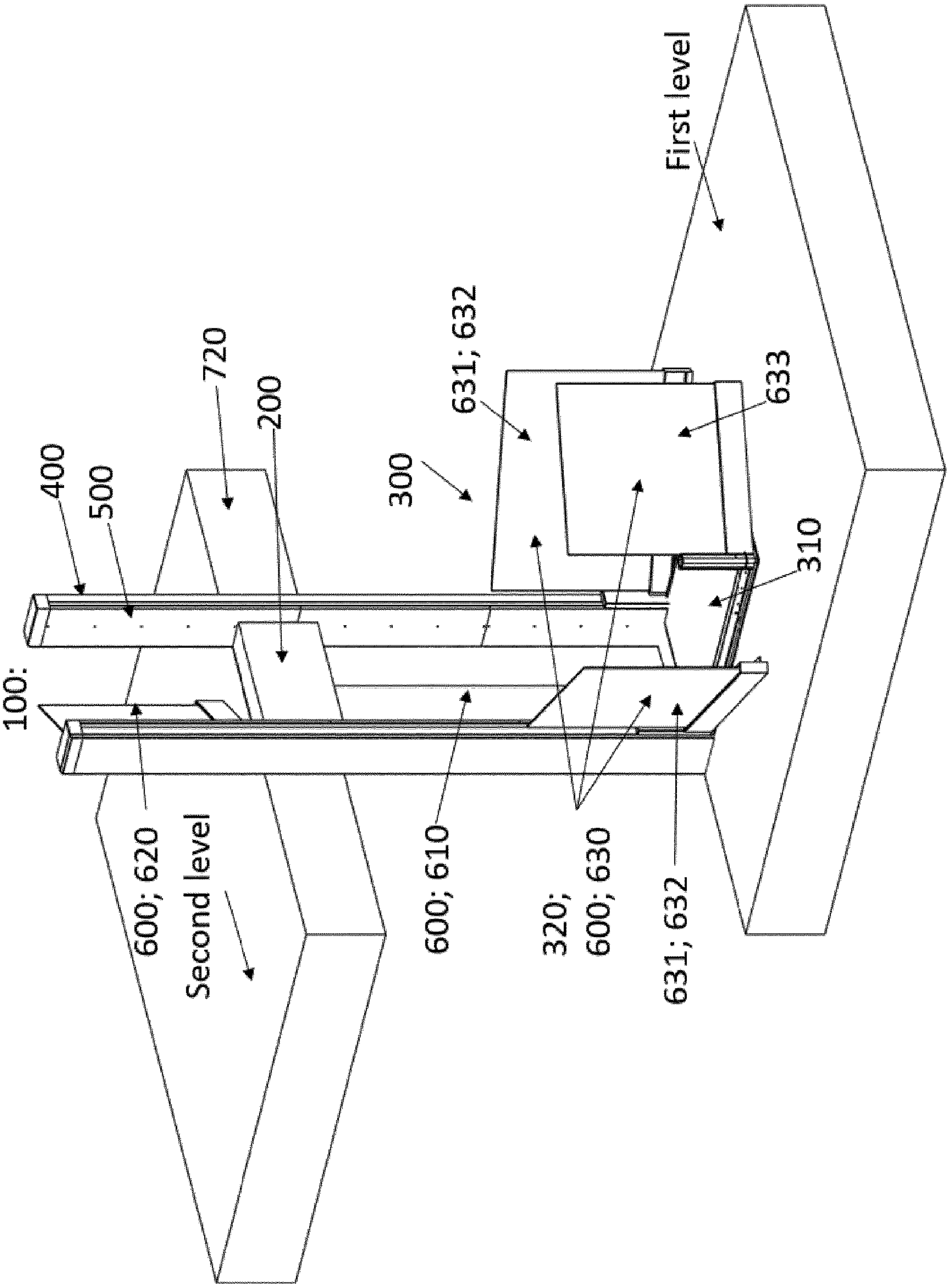
FIG. 4 illustrates potential access openings of a lifting system.

FIG. 4 illustrates potential access openings 600 of a lifting system 100. Within the invention, the lifting system 100 can comprise a plurality of access openings 600, and it should be understood, that the number of access openings 600 should not be limiting for the scope of the invention. In FIG. 4, potential access openings are illustrated, wherein the platform lifting system 100 has at least three access openings:

- the first access opening 610 being positioned between the two columns 400 and being under the floor deck 720, preferably positioned at least substantially at the bottom of the two columns 400 and below the drive unit 200. This first access opening 610 between the two columns and through the wall is preferably within the invention comprising at least one door, such as a hinged door or a sliding door.
- a second access opening 620 being positioned between the two columns 400 and above the first access opening 610, preferably positioned above the drive unit 200,
- a third 630, a fourth and a fifth access opening being positioned at the platform 300 and being:
  - a platform front access opening 633, and
  - a first platform side access opening 631, and
  - a second platform side access opening 632.

The access openings 600 of the platform lifting system 100 illustrated in FIG. 4 should be understood only as illustrative. It would be rare that all the three sides of the platform 300 are all acting as access openings 600 at the same time and within the same lift configuration, however it is in principle possible. The access openings 630 of the platform 300 are illustrated as gates, however the openings could also take other configurations than gates.

FIG. 5*a-d* illustrate potential placements of a drive unit between the two columns 400 of a lifting system 100.

Figure 5A:
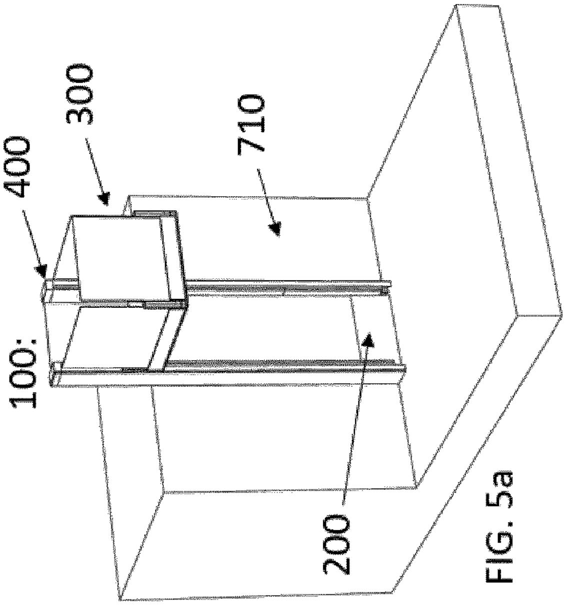
FIG. 5*a-d* illustrate potential placements of a drive unit between the two columns of a lifting system.
Figure 5B:
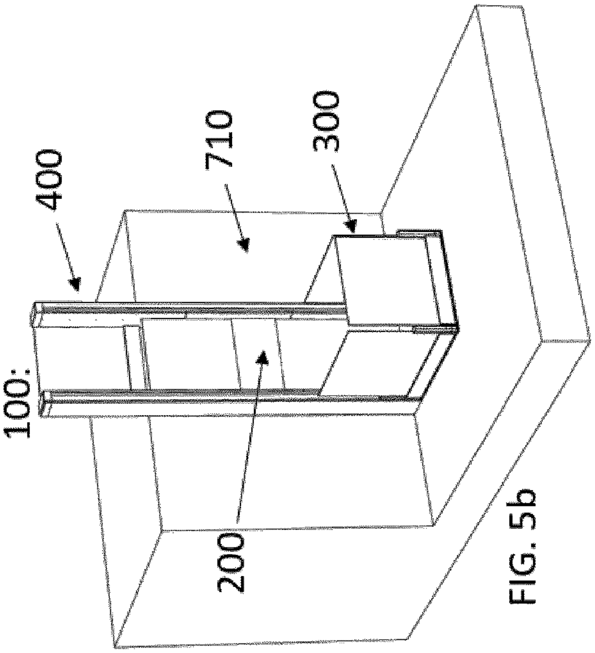
Figure 5C:
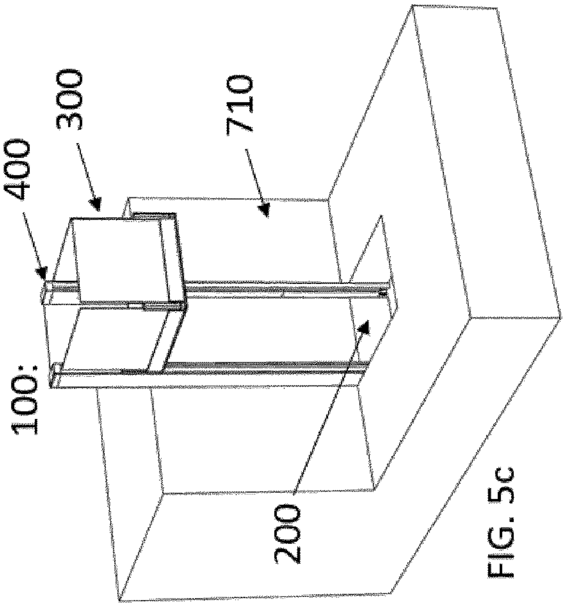
Figure 5D:
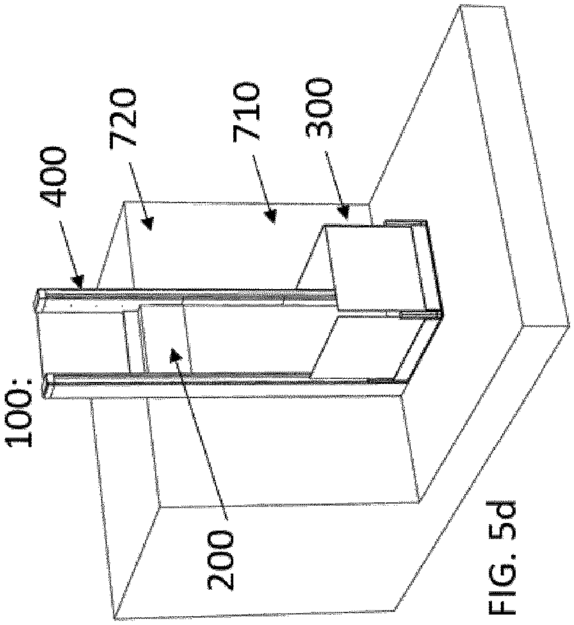

- FIG. 5*a* illustrates a drive unit 200 placement in a lowermost level near the floor.
- FIG. 5*b* illustrates a drive unit 200 placement in a middle part of a wall 710.
- FIG. 5*c* illustrates a drive unit 200 placement in a floor recess (a pit).
- FIG. 5*d* illustrates a drive unit 200 placement on a floor deck 720 via the wall 720, positioned above a first access opening 610 and below a second access opening 620.

Within the invention, the drive unit can be mounted on a wall 710 or a floor deck 720 of an associated building 700. The drive unit may also be called a "freely placeable" drive unit 200, meaning that as long the drive unit 200 is mounted between the two columns 400, it can be mounted anywhere within the area defined by the two columns 400.

It should be understood that when describing the access openings 600 as "a first" access opening, "a second" access opening, "a third access" opening and so on, the numbering of the openings are only to make the illustration and understanding easier. The numbering of the access openings 600 should not be limiting to the invention. Such that an access opening being numbered as "the/a first" access opening in one lifting system, may be numbered as "the/a second or third, etc." access opening in another lifting system 100. The numbering will depend of the configuration of the lifting system and the associated building that the lifting system is to be mounted at.

FIG. 6 illustrates the steps of the method according to the invention of moving a platform 300 of a platform lifting system 100 from at least a first level to second level.

Figure 6B:
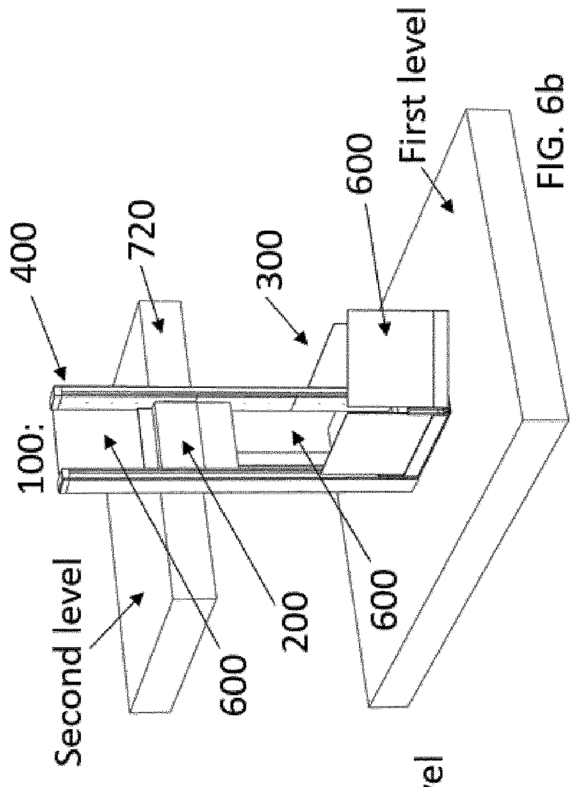
FIG. 6 illustrates the steps of the method according to the invention of moving a platform of a platform lifting system from a first level to a second level.
Figure 6D:
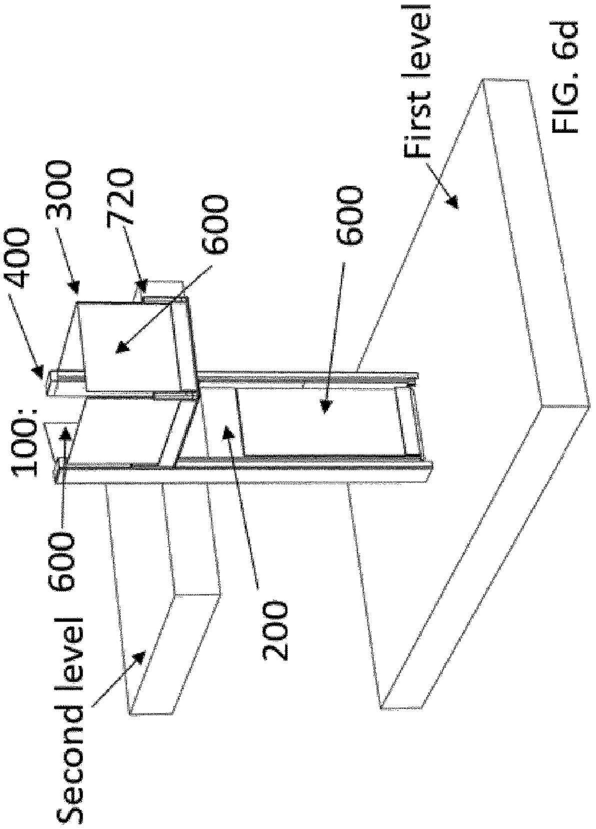
Figure 6A:
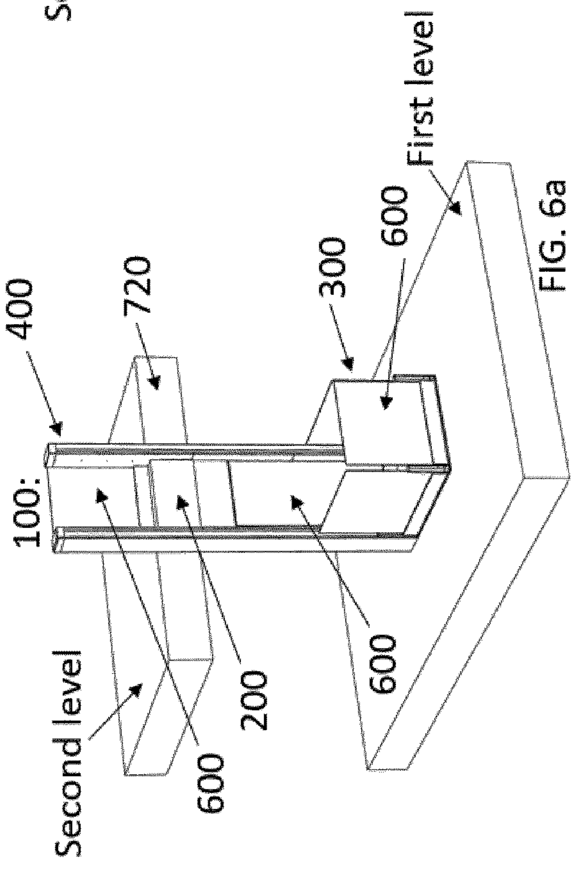
Figure 6C:
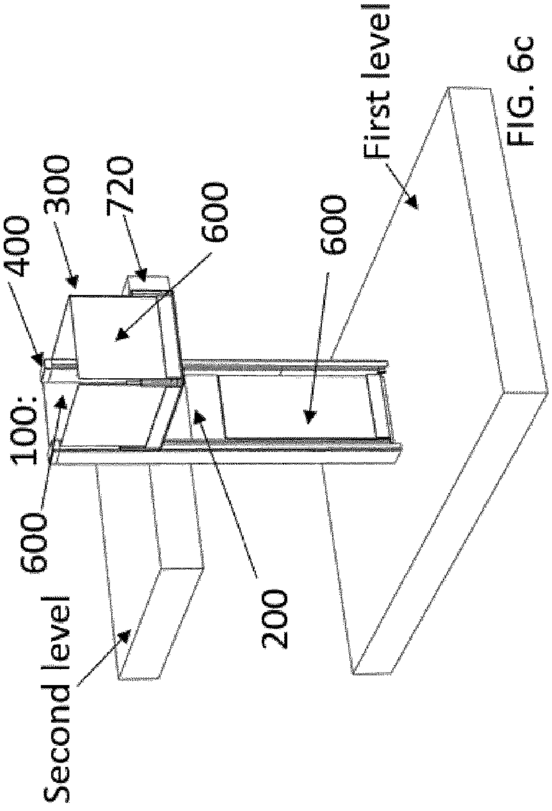

- FIG. 6*a* illustrates: ensuring a platform 300 being in a first level with at least one access opening 600,
- FIG. 6*b* illustrates: opening at least one access opening 600, said access opening being positioned between two columns 400. The access opening illustrated being a door allowing to enter the platform 300 through a wall 710. The columns 400 being adapted to facilitate an up and down movement of the platform 300 via a drive system 500. Also FIG. 6*b* illustrates the possibility of entering the platform 300 via an access opening of one of the sides 320 of the platform itself.
  - The access opening(s) 600 thereby allow a person or an object to enter the platform 300 via an access opening or another access opening.
- FIG. 6*c* illustrates: that the access openings 600 are closed to start moving the platform 300 in an upwards direction. The direction could also have been downwards. When moving upward, the platform 300 passes a drive unit 200 of the lifting system 100. The drive unit 200 has a depth being equal or less a depth of the two columns 400, enabling the platform to pass the drive unit 200 when moving up (or down) on the two columns 400.
- FIG. 6*d* illustrates: the stopping of the movement of the platform, when the platform has reached a second level with another access opening 600, thereby allowing a person or an object to exit the platform 300 via the another access opening 600, wherein at least a second door or gate is opened to allow access to a the second level.

It should be understood, that the steps can be performed in any order, subsequently and/or simultaneously.

Figure 7:
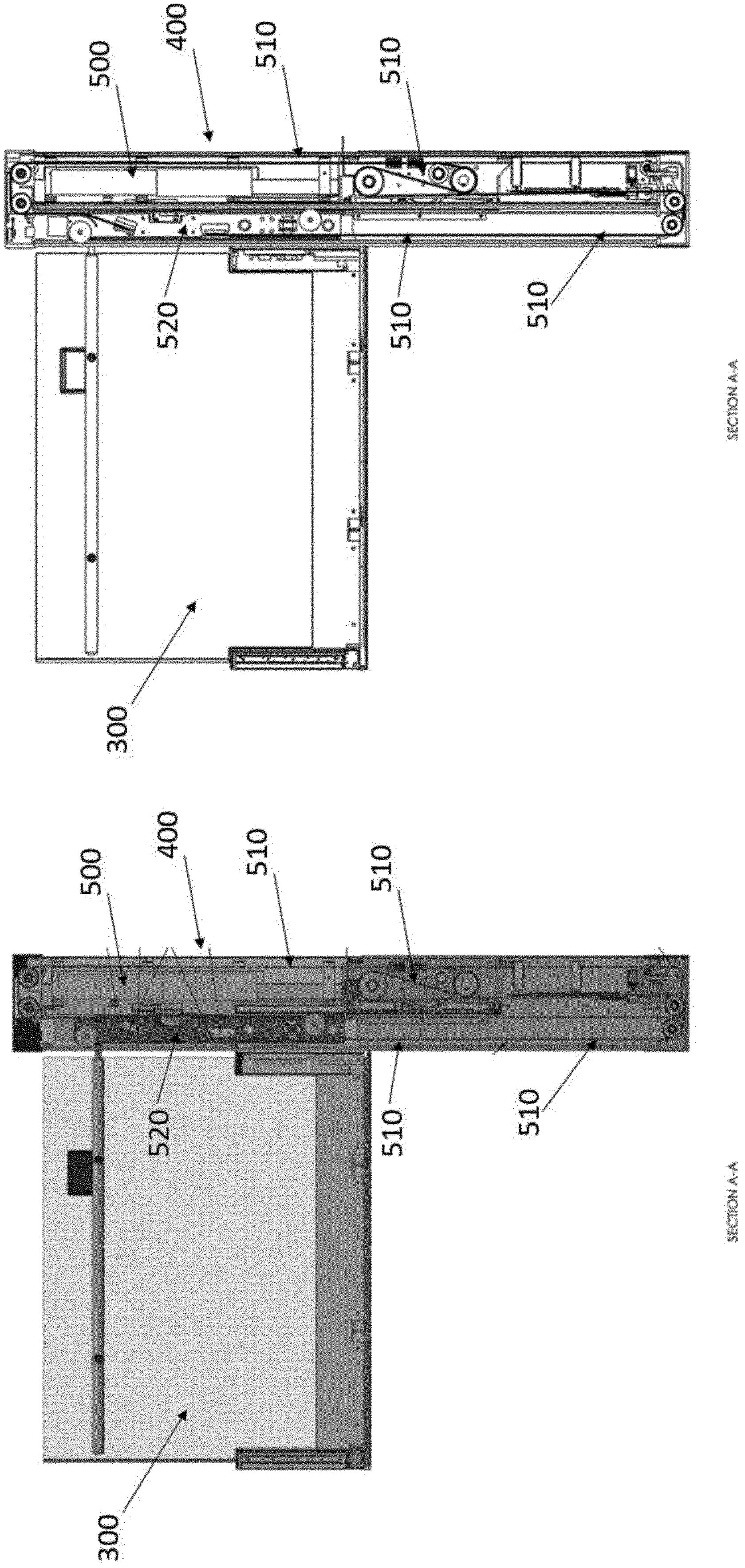
FIG. 7 illustrates a cross section of a column with a closed drive system.

FIG. 7 illustrates a cross section of a column 400 with the closed end drive system 500. The closed end drive system 500 illustrated is a closed belt system with an endless belt 510. However, within the context of the invention the drive system may be any closed end drive system.

In FIG. 7, it should be understood that an endless belt 510 or the like can be connected at its ends via a connecting element 520, preferably a laser-cut steel tube or another kind of tube or the like. Preferably, the platform 300 is connected to the belt at the connecting element 520. The belt is via the connecting element "endless" in the sense that the ends are fixed in the same tube and can therefore not move in relation to each other.

Figure 8:
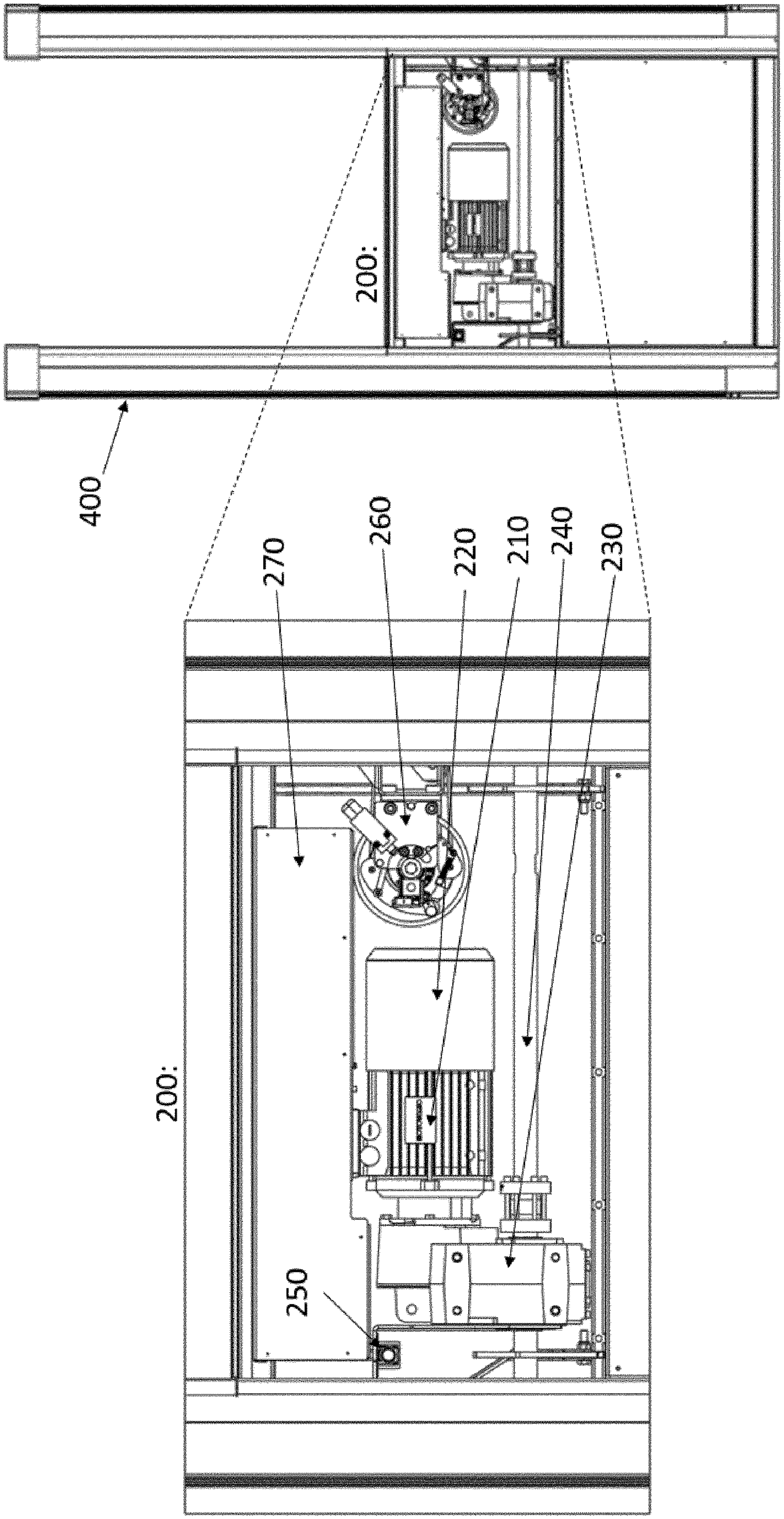
FIG. 8 illustrates a cross section of a drive unit.

FIG. 8 illustrates a cross section of a drive unit 200. Within the context of the invention, the drive unit 200 preferably comprises a least:

- A motor 210, preferably an electric motor, and preferably with a motor brake 220.
- A gear system 230.
- A driving pulley 240, being a driving axle on which a drive pulley is mounted in both ends.

The drive unit illustrated in FIG. 8 further comprises:

- An overload detector 250.
- An overspeed governor 260.
- Electric components 270 encased in a box to shield from EMC radiation (faraday cage).

The drive unit 200 illustrated in FIG. 8 has a depth being equal or less than the depth of the two columns 400, enabling the platform 300 to pass the drive unit when moving up or down on the two columns.

Figure 9:
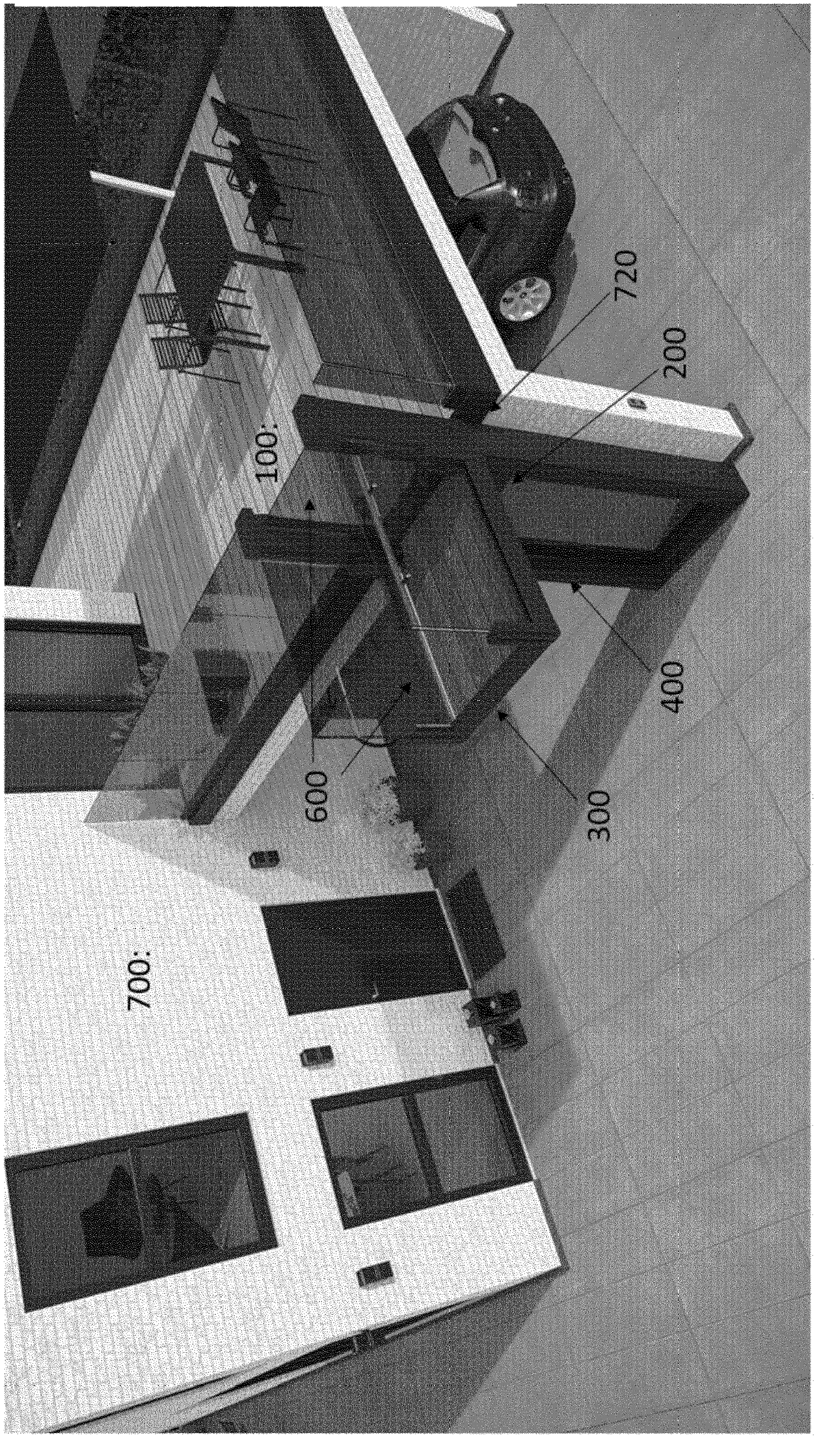
FIG. 9 illustrates a 3D picture of a potential type and positioning of the lifting system according to the invention.

FIG. 9 illustrates a 3D picture of a potential type and positioning of the lifting system according to the invention. The lifting system 100 with a platform 300 is in FIG. 9 mounted on an outdoor floor deck 720 of an associated building 700, and being an open platform lift 300.

In exemplary embodiments E1-E15, the invention may relate to:

E1. A platform lifting system (100) for transporting a person or an object from at least a first level to a second level, wherein the platform lifting system comprises:

a drive unit (200), a platform (300), at least two vertical columns (400), wherein said columns are adapted to facilitate an up and a down movement of the platform (300), a drive system (500) positioned on or within at least one of the two columns, wherein said drive system is adapted to facilitate the up and down movement of the platform, at least two access openings (600), wherein the drive system (500) is a closed end system, preferably a closed end belt system, wherein the drive unit (200) is mounted between the two columns (400), said drive unit can be placed anywhere within an area defined by the two columns, and wherein the drive unit (200) has a depth being equal or less than the depth of the two columns (400), enabling the platform (300) to pass the drive unit when moving up or down on the two columns.

E2. The platform lifting system (100) according to embodiment E1, wherein the at least two columns (400) are mounted on a wall (710) of an associated building (700).

E3. The platform lifting system (100) according to embodiment E1, wherein the at least two columns (400) are mounted on at least one floor deck (720) of an associated building (700).

E4. The platform lifting system (100) according to any of the preceding embodiments, wherein a first access opening (610) is through the wall (710) of the associated building (700).

E5. The platform lifting system (100) according to any of the preceding embodiments, wherein a first access opening (610) is positioned under the at least one floor deck (720) of the associated building (700).

E6. The platform lifting system (100) according to any of the preceding embodiments, wherein a first access opening (610) comprises at least one door, such a hinged door or a sliding door.

E7. The platform lifting system (100) according to any of the preceding embodiments, wherein the drive unit (200) is mounted on a wall (710) or a floor deck (720) of an associated building (700).

E8. The platform lifting system (100) according to any of the preceding embodiments, wherein the drive unit (200) is positioned above the first access opening (610) and below a second access opening (620).

E9. The platform lifting system (100) according to any of the preceding embodiments, wherein a first access opening (610) is positioned between the two columns (400) and positioned at least substantially at the bottom of the two columns (400), such that an access opening in the lowermost level is provided, preferably though a wall (710) of the associated building (700).

E10. The platform lifting system (100) according to any of the preceding embodiments, wherein the platform lifting system has at least three access openings (600), wherein;

the first access opening (610) being positioned between the two columns (400), preferably positioned at least substantially at the bottom of the two columns and below the drive unit (200), a second access opening (620) being positioned between the two columns (400) and above the first access opening (610), preferably positioned above the drive unit (200), a third access opening (630) being positioned at the platform (300) and being at least one of:

a first platform side access opening (631), and/or a second platform side access opening (632), and/or a platform front access opening (633).

E11. A platform lifting system (100) according to any of the preceding embodiments, wherein the platform (300) comprises an open platform, said open platform has an open top, or wherein the platform (300) comprises a closed platform, said closed platform has a top cover, such as a roof.

E12. A platform lifting system (100) according to any of the preceding embodiments, wherein the platform lifting system is mounted on an outdoor wall (710) or outdoor floor deck (720) of an associated building (700).

E13. A platform lifting system (100) according to any of the preceding embodiments wherein the platform lifting system is mounted on an indoor wall (710) or indoor floor deck (720) of an associated building (700).

E14. A method for moving a platform of a platform lifting system (100) from at least a first level to second level, preferably a platform lifting system according to any of the preceding claims, wherein the method comprises at least the steps of:

ensuring (S1) a platform (300) being in a first level with a access opening (600), opening (S2) the access opening (600), said access opening being positioned between two columns (400), said columns being adapted to facilitate an up and down movement of the platform (300) via a drive system (500), allowing (S3) a person or an object to enter the platform (300) via the access opening, wherein a door or gate is opened to allow access, closing (S4) said door or gate, moving (S5) the platform (300) in an upwards or downwards direction, passing (S6) a drive unit (200) of the lifting system (100) with the platform (300), said drive unit has a depth being equal or less a depth of the two columns (400), enabling the platform (300) to pass the drive unit when moving up or down on the two columns (400), stopping (S7) the movement of the platform (300), when the platform has reached a second level with another access opening (600), allowing (S8) a person or an object to exit the platform (300) via the another access opening (600), wherein at least a second door or gate is opened to allow access to a the second level, and wherein the steps can be performed in any order, subsequently and/or simultaneously.

E15. A computer program comprising instructions which, when the program is executed by a computer, cause the computer to carry out the method of at least embodiment E14.

Although the present invention has been described in connection with the specified embodiments, it should not be construed as being in any way limited to the presented examples. The scope of the present invention is set out by the accompanying claim set. In the context of the claims, the terms “comprising” or “comprises” do not exclude other possible elements or steps. Also, the mentioning of references such as “a” or “an” etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCE LIST

Platform lifting system (100)
Drive unit (200)
a motor 210.
a motor brake 220.
a gear system 230.
a driving pulley 240.
an overload detector 250.
an overspeed governor 260.
electric components 270.
Platform (300)
Platform bottom (310)
Platform sides (320)
Vertical column (400)
Drive system (500)
Endless belt (510)
Connecting element (520)
Access Openings (600)
A first access opening (610)
A second access opening (620)
A third access opening (630)
a first platform lift side access opening (631).
a second platform lift side access opening (632).
a platform front lift access opening (633).
Associated building (700)
Wall of associated building (710)
Floor deck of associated building (720)

The invention claimed is:

1. A platform lifting system for transporting a person or an object from at least a first level to a second level, wherein the platform lifting system comprises:

a drive unit, a platform, at least two vertical columns, wherein said columns are adapted to facilitate an up and a down movement of the platform, a drive system positioned on or within at least one of the two columns, wherein said drive system is adapted to facilitate the up and down movement of the platform, a first access opening and a second access opening, wherein the drive system is a closed end system, wherein the drive unit is mounted between the two columns, said drive unit can be placed anywhere within an area defined by the two columns, and the two columns extend vertically above the drive unit, wherein the drive unit has a depth being equal or less than the depth of the two columns, enabling the platform to pass the drive unit when moving up or down on the two columns, and wherein the at least two columns are mounted on a wall or on at least one floor deck of an associated building and at least one of the first access opening and the second access opening is provided between the two columns.

2. The platform lifting system according to claim 1, wherein the first access opening is through the wall of the associated building.

3. The platform lifting system according to claim 1, wherein the first access opening is positioned under the at least one floor deck of the associated building.

4. The platform lifting system according to claim 1, wherein the first access opening comprises at least one door.

5. A platform lifting system according to claim 4, wherein the at least one door includes a hinged door or a sliding door.

6. The platform lifting system according to claim 1, wherein the drive unit is mounted on a wall or a floor deck of an associated building.

7. The platform lifting system according to claim 1, wherein the drive unit is positioned above the first access opening and below the second access opening.

8. The platform lifting system according to claim 1, wherein the first access opening is positioned between the two columns and positioned at least substantially at the bottom of the two columns, such that an access opening in the lowermost level is provided.

9. The platform lifting system according to claim 1, wherein the platform lifting system has at least three access openings, wherein;

the first access opening being positioned between the two columns, a second access opening being positioned between the two columns and above the first access opening, a third access opening being positioned at the platform and being at least one of:

a first platform side access opening, and/or a second platform side access opening, and/or a platform front access opening.

10. A platform lifting system according to claim 1, wherein the platform comprises an open platform, said open platform has an open top, or wherein the platform comprises a closed platform, said closed platform has a top cover, such as a roof.

11. A platform lifting system according to claim 1, wherein the platform lifting system is mounted on an outdoor wall or outdoor floor deck of an associated building.

12. A platform lifting system according to claim 1, wherein the platform lifting system is mounted on an indoor wall or indoor floor deck of an associated building.

13. A platform lifting system according to claim 1, wherein the drive system is a closed end belt system.

14. A platform lifting system according to claim 1, wherein the access opening in the lowermost level is provided through a wall of the associated building.

15. A platform lifting system according to claim 1, wherein the first access opening is positioned at least substantially at the bottom of the two columns and below the drive unit.

16. A platform lifting system according to claim 1, wherein the second access opening is positioned above the drive unit.

17. A method for moving a platform of a platform lifting system from at least a first level to second level, a platform lifting system according to claim 1, wherein the method comprises at least the steps of:

ensuring a platform being in a first level with an access opening, opening the access opening, said access opening being positioned between two columns, said columns being adapted to facilitate an up and down movement of the platform via a drive system, allowing a person or an object to enter the platform via the access opening, wherein a door or gate is opened to allow access, closing said door or gate, moving the platform in an upwards or downwards direction, passing a drive unit of the lifting system with the platform, said drive unit has a depth being equal or less a depth of the two columns, enabling the platform to pass the drive unit when moving up or down on the two columns, stopping the movement of the platform, when the platform has reached a second level with another access opening, allowing a person or an object to exit the platform via the another access opening, wherein at least a second door or gate is opened to allow access to the second level, and wherein the steps can be performed in any order, subsequently and/or simultaneously.

18. A computer program executable on a non-transitory computer-readable storage medium, comprising instructions which, when the program is executed by a computer, cause the computer to carry out the method of at least claim 17.

* * * * *